United States Patent Office 3,241,990
Patented Mar. 22, 1966

3,241,990
ALKALI METAL SILICATE COMPOSITIONS
AND PROCESS OF MANUFACTURE
John Gordon Harrison, 2236 Arta Way, Antioch, Calif.
No Drawing. Filed Mar. 10, 1965, Ser. No. 438,781
18 Claims. (Cl. 106—74)

This application is a continuation-in-part of my co-pending application Serial Number 188,529, filed April 18, 1962, now forfeited.

My invention relates, in general, to the use of soluble silicates and, more particularly, to processes for the manufacture of siliceous products utilizing a novel chemical reaction and to the compositions produced thereby.

Aqueous solutions of soluble silicates, e.g., sodium and potassium silicates, are widely employed for a great many purposes. The materials have been employed, for example, as adhesives in the manufacture of cardboards and as a binder and finishing agent in paper. The solutions have also been employed in reactions with various metal ions under appropriate pH conditions to produce silica gels. Soluble silicates have also been employed in cements, fireproofing coatings, for bonding abrasives, in soil treatment and for other purposes to which the teachings of the invention may be applicable.

Now I have discovered a chemical reaction which modifies the behavior of aqueous silicate solutions whereby the provision of various of the foregoing products is facilitated and whereby a variety of novel compositions may be produced. Basically such reaction occurs upon the addition of a mixture of sodium sulfite and hydrogen peroxide to a soluble silicate solution whereupon a pliable, resilient, deformable semi-solid material is produced which material can be processed further to provide a wide variety of products. In other cases a viscous solution is provided which may also be employed for sundry purposes as set forth hereinafter. There is some reason to believe that the reaction may involve certain little understood catalytic factors.

Accordingly it is an object of my invention to provide novel processes utilizing soluble silicate solutions.

Another object of my invention is to provide improved methods of producing siliceous products utilizing aqueous solutions of soluble silicates.

Still another object of my invention is to provide a method wherein the reaction between sodium sulfite and hydrogen peroxide is utilized to increase the viscosity of an aqueous solution of a soluble silicate.

A further object of my invention is to provide a method wherein a reaction between hydrogen peroxide and sodium sulfite is utilized to convert admixtures of aqueous soluble silicates with other materials into a form suitable for processing into a variety of finished products.

A still further object of my invention is to provide novel compositions including soluble silicates reacted with a mixture of hydrogen peroxide and sodium sulfite.

The invention possesses other objects and features of advantage, some of which, with the foregoing, will be set forth in the following description of the preferred form of the invention. It is to be understood, however, that variations in the showings made by the said description may be adopted within the scope of the invention as set forth in the claims.

Understanding of the invention will be assisted by consideration of the aforesaid chemical reaction in what may be considered to be a simplified form. In general during the mixing of composition in the processes of the invention appropriate proportions of aqueous hydrogen peroxide solution are admixed with solid sodium sulfite whereupon an energetic exothermic reaction occurs and proceeds for some period of time. However, if the aforesaid intermixture is promptly incorporated into an aqueous solution of a soluble silicate such as sodium silicate, a progressive increase in viscosity occurs and if sufficient proportions of the peroxide-sulfite admixture is added a rubbery, pliable semi-solid mass or putty-like mass, is produced. The solution forms of the reaction product can be employed as an adhesive, coating material and in other ways set forth hereinafter. The semi-solid material may likewise be employed or a large variety of other ingredients can be added, e.g., to the original silicate solution or otherwise be incorporated into the reaction mixture as discussed more fully hereinafter.

The order of mixing the sodium sulfite, hydrogen peroxide and silicate is not crucial, the important feature being that the silicate should be brought into intimate contact with a reacting mixture of sulfite and peroxide. Thus, the sodium sulfite and peroxide may first be mixed in the required proportions and, when reaction starts, the mixture may be stirred into the silicate solution. On the other hand, particularly when large batches are being processed, better control with more consistent results may be obtained by first mixing the solid sodium sulfite with the silicate solution and then adding the required amount of hydrogen peroxide, which promptly reacts with the sulfite and the reacting mixture instantly contacts the silicate, in-situ.

The soluble silicates most commonly employed are the sodium and potassium salts of orthosilicic and metasilicic acids and, of these, aqueous solutions of sodium silicate are most generally employed herein. Sodium silicate solutions are known by other names such as "water glass," etc., and are marketed with viscosities of 0.5 to 600,000 poises at 20° C. Solutions having viscosities in the intermediate to more viscous in said range are generally preferred. The pH and other properties depend upon the composition which may vary from $2Na_2O.SiO_2$ to $$Na_2O.4SiO_2$$

Water glass generally has about 40% sodium silicate content while other common commercial solutions have a density of about 40° Bé. Solutions having a content of about 30 to 70% sodium silicate can be employed in various operations herein.

Sodium sulfite in the more stable anhydrous form is preferred for use herein. Very large quantities of by-product sodium sulfite are obtained in the manufacture of phenol by fusion of sodium benzene sulfonate and sodium hydroxide. The anhydrous sodium sulfite granular powder obtained as a by-product contains in the order of 1 to 2% phenol wherefor the material is not suitable for many purposes for which sodium sulfite is often used, e.g., in food stuffs. Accordingly, a very large tonnage of the material is now available for which there is no practical use. This material is ideal for many of the uses described herein as the residual phenol can serve as a microbiological growth inhibitor, modifying material, etc., or is inert or is eliminated by processing. However, disregarding cost, sulfite from other sources may be used such as, for example, commercially pure sodium sulfite; or, with proper compensation for pH, sodium bisulfite may be substituted.

The hydrogen peroxide is used in various concentrations and for many purposes the commercially available 3% aqueous solution inhibited with acetanilide is quite satisfactory. Where it is desired to limit the amount of water added to the mix, commercial concentrations up to about 20% may be used. Higher concentrations of peroxide must be utilized with caution due to the highly exothermic nature of the reaction with sodium sulfite. Sodium peroxide, as is well known, will decompose in the presence of water with the liberation of hydrogen peroxide. Though the reaction is somewhat hazardous, this source of hydrogen peroxide is within the broad scope of the invention.

One very interesting use for the basic composition produced in the reaction of a mixture of hydrogen peroxide and sodium sulfite with a sodium silicate as a general dipping medium is illustrated by the preservative treatment of eggs. Also, a notable proportion of eggs obtained in normal laying experience have shells too weak for shipment or have other shell defects. Treatment of such eggs, which are otherwise quite normal, or normal eggs as described hereinafter produces a shell having superior preservative qualities as well as being strong and resistant to impact damage. In this procedure about 2 oz. (4 tablespoons) of sodium sulfite as from phenol production is admixed with about 1 to 2 oz. (2 to 4 tablespoons) of 3% hydrogen peroxide whereupon an energetic exothermic reaction begins. The heated mixture produced thereby is added to about 4 oz. (6 tablespoons) of water glass (40% sodium silicate) with mixing. Eggs are then dipped momentarily into the mixture maintained in a semi-fluid condition at about 110° F. The eggs are withdrawn and the shells cooled rapidly as by a blast of a cold gas, e.g., $CO_2$ or liquid oxygen or nitrogen providing a tightly adherent reinforcing white layer of the composition resembling a clear white egg shell on the shell. The reinforcing layer, however, is somewhat resilient and is not brittle like egg shell. Eggs cooled as above have successfully withstood dropping from a four foot height upon a hardwood floor with no apparent internal damage. Moreover, the shells are sealed adequately to assure preservation for extended periods of time and fertile eggs have retained fertility for periods of time adequate to permit shipment without stringent refrigeration requirements.

Other materials dipped in such a solution can likewise be coated, e.g., for fireproofing. Somewhat superior results are obtained if the materials are dehydrated as by heating in air to a temperature of 100 to 200° C. Moreover the coating or moldings made from such a solution can be fired to high temperatures, e.g., about 800–1000° C. to produce vitreous coatings having excellent electrical resistance. Some of these products have withstood direct flame conditions in a furnace at 1700° C.

Furthermore a wide variety of inert and/or reactable filler materials can be admixed with the soluble silicate or with the sodium sulfite so that upon intermixing in the presence of hydrogen peroxide, as above, viscous mixes suitable for molding, coating, sheeting, laminating and the like are produced. For example, an aqueous slurry of a cellulosic fiberous material containing one or more materials such as wood pulp, reconstituted paste board or paper, etc., of 20 to 60% solids content by weight may be employed with or without mineral fillers such as clay, etc. An aqueous sodium silicate solution is added to provide 5 to 15% by weight of silicate in the solution. Then a hydrogen peroxide-sulfite mixture in relative proportions as above may be added whereupon the aqueous suspension becomes more viscous with flocculation of the fibers. The silicate and other materials in the aqueous suspension behave somewhat as if a coagulation occurs; however, separation of a definitive separate phase does not usually occur. The suspensions having a lower solids content can be screened to produce sheeted materials which upon drying, e.g., at 100 to 200° C., resemble a strong cardboard or building hardboard of low density if uncompressed. Compression yields a hard, smooth finished board composition. A variety of other fibrous materials such as rayon, nylon, fiber glass, asbestos and the like may be employed similarly. Moreover, about 5–15% by weight of such fibrous materials can also be employed as additives in compositions of the character described hereinafter.

Certain slightly soluble inorganic chemical or mineral materials may be incorporated in the mixture which forms a pliable putty-like mixture which remains in a pliant workable state for some time after mixing. These may include materials of the character of sparingly soluble or reactable alkaline earth metal and other metal oxides, carbonates, hydroxides, and equivalent materials. Calcium, magnesium and barium compounds are generally preferred. Certain other mineral constituents including gypsum, plaster of Paris, various clay products, silica powder and sand, titanium dioxide, aggregates particularly vermiculite and pumice may be included in amounts of 10 to 50% to increase bulk, reduce density and the like. Several typical recipes are shown in the following table wherein the exemplary proportions are given in ounces by weight.

Table

|  | A, oz. | B, oz. | C, oz. | D, oz. | E, oz. | F, oz. |
|---|---|---|---|---|---|---|
| Sodium silicate [1] | 32 | 32 | 32 | 32 | 32 | 32 |
| Sodium sulfite | 16 | 16 | 16 | 16 | 16 | 16 |
| Hydrogen peroxide | 3 | 3 | 3 | 3 | 3 | 3 |
| Calcium hydroxide (Pwd.) | 4 | 4 |  |  | 2 |  |
| Silica (powdered sand) |  | 16 |  |  |  | 5 |
| $CaCO_3$ |  |  | 2 | 2 | 2 | 2 |
| $Ba(OH)_2$ |  |  | 2 | 2 | 2 | 2 |
| Clay (Potter's) |  |  |  | 6 |  | 2 |
| Diatomaceous earth |  |  |  |  | 10 | 5 |
| Pumicite (Powd.) |  |  | 10 |  |  |  |

[1] 40% aqueous sodium silicate (commercial water glass).

The filler and reactable solids are admixed with the silicate solution with additional water if necessary to form a viscous slurry. The peroxide and sodium sulfite are admixed as above and are immediately incorporated into the slurry of other ingredients whenceforth the resulting composite plastic pliable mixture is molded as desired, applied, e.g., as a cement, grout, joint filler, etc., or is spread to form a sheet. Thenceforth, over a period of several hours the mass solidifies into a durable, hard, water insoluble solid.

The foregoing mixtures are also converted into vitreous solids upon being fired to high temperatures. Usually these fired materials are somewhat porous and ceramic ware made therefrom should be provided with a glaze to provide water-tight vessels. However, the porosity is advantageous in other instances, for example, in the manufacture of catalysts. Appropriate proportions of catalytic agents such as vanadium oxides, alumina, manganese oxides, iron oxide, copper oxide, etc., may be incorporated into the mixtures of the table or as substitutes for the fillers set forth therein. The plastic mass may then be pelleted, dried and then fired to provide a practical catalyst material. Moreover, the inert agents can be substituted with granular silicon carbide, alundum or other hard abrasive materials in appropriate proportions to provide a final silicate content of about 5 to 15% by weight, e.g., in abrasive wheels produced by molding and firing of the plastic mass.

In certain instances it has been found processing is facilitated if an organic binder material is included in minor proportions. For example, nitrocellulose added as a 10% solution in ethyl-acetate, acetone solvent in the amount of 4 oz. in Recipe A, as a substitute for the calcium hydroxide, yields a plastic mass which can easily be molded and then fired to produce ceramic or vitreous base structures. An interesting effect is noted in that the foregoing mixture becomes pink in color upon admixture although firing yields a white or grayish white product on firing in the absence of color producing pigments.

It will be appreciated that silicate chemistry and technology is difficult if not impossible to elucidate due to the number and complexities of the principles involved. The manner in which the reaction produces the above-indicated results is not subject to easy explanation. It is noted that catalytic factors may be involved in the reaction of hydrogen peroxide with the sodium sulfite as well as in the co-reaction with the sodium silicate. Oxidation-reduction actions occur some of which may produce materials such as sulfur dioxide, sulfate, acidic substances as well as complex reaction products including silicates. In any event the modification in processing characteristics of the solutions made more viscous or of the intermediate plastic composites should prove to be highly beneficial. It will be appreciated that the relative amounts of sulfite-peroxide mixture utilized may vary dependent upon the concentration, metal ion-silicate ratios, pH and similar differences of the silicate solutions. It is possible that the sulfite as well as the phenol contribute to the preservative qualities of the compositions.

What is claimed is:

1. In a process for producing a coated composite structure, the steps comprising intermixing of about 4 parts by weight of an aqueous solution containing about 30 to 70% by weight of a material selected from the group consisting of sodium and potassium silicates wherein the alkali metal oxide to $SiO_2$ content ratio is in the range of about 2:1 to about 1:4 with a reacting mixture of about 2 parts by weight sodium sulfite and hydrogen peroxide in amount equivalent to about 1 to 2 parts by weight of a 3% aqueous solution to increase the viscosity thereof, dipping a solid article in said solution, and cooling the dipped article to set adherent solution thereon.

2. The process as defined in claim 1 wherein said sodium sulfite is first admixed with said hydrogen peroxide and, while reacting, the resulting mixture is admixed with said aqueous silicate solution.

3. The process as defined in claim 1 wherein said reacting mixture of sulfite and peroxide is formed in situ in the aqueous silicate solution by first mixing said sulfite with said silicate solution and then admixing therewith said peroxide, whereby contact of the silicate with reacting sulfite-peroxide mixture is assured.

4. The process as defined in claim 1 wherein said dipped article is dehydrated at a temperature in the range of about 100 to 200° C. to render the adherent coating more water insoluble.

5. In a process for producing a solid siliceous article utilizing an aqueous solution containing about 30 to 70% by weight of a soluble alkali metal silicate wherein the alkali metal oxide to $SiO_2$ content ratio is in the range of about 2:1 to about 1:4, the steps comprising admixing about 4 parts by weight of said solution with a reacting mixture of about 2 parts by weight sodium sulfite and hydrogen peroxide in amount equivalent to about 1 to 2 parts by weight of a 3% aqueous solution to produce a plastic mass therefrom, molding said plastic mass into a form appropriate to said article, and dehydrating said molded plastic form of said admixture by contact with heated air.

6. The process as defined in claim 5 wherein said dehydrated molded plastic form is fired at an elevated temperature to produce a vitreous solid siliceous article.

7. The process as defined in claim 5 wherein 20 to 60% by weight of the final composition of a cellulose fibrous filler material is included in said soluble silicate solution.

8. The process as defined in claim 5 wherein about 4 to 6 parts by weight of an alkaline earth material from the group consisting of metal oxides, carbonates and hydroxides is included in about 32 parts by weight of said silicate solution upon reaction with said admixture.

9. In a process for producing a solid siliceous article utilizing an aqueous solution of a material selected from the group consisting of sodium and potassium silicates, wherein the alkali metal oxide to $SiO_2$ content ratio is in the range of about 2:1 to about 1:4, the steps comprising combining about 10 to 50% by weight of the final composition of a mixture at least one inert filler material and at least one alkaline earth material selected from the group consisting of metal oxides, carbonates and hydroxides in amounts of about 4 to 6 parts by weight with about 32 parts by weight of said solution, intermixing a reacting mixture of about 16 parts by weight sodium sulfite and hydrogen peroxide in amount equivalent to about 3 to 16 parts by weight of a 3% aqueous solution with the mixture produced in the aforesaid step to produce a pliant plastic mass therefrom, and molding said pliant plastic mass in the form of said article.

10. The process as defined in claim 9 wherein a solution of nitrocellulose in a solvent is included in the intermixing step.

11. The process as defined in claim 9 wherein said molded plastic mass is dehydrated by contact with heated air to improve the water insolubility of the finished product.

12. In a process for producing a solid siliceous article utilizing an aqueous solution containing about 30 to 70% by weight of a soluble alkali metal silicate, wherein the alkali metal oxide to $SiO_2$ content ratio is in the range of about 2:1 to about 1:4, the steps comprising intermixing said solution in amounts sufficient to provide 5 to 15% silicate in the final product with a granular abrasive material and with a reacting admixture of sodium sulfite and hydrogen peroxide in proportions of about 4 parts by weight of said solution to about 2 parts by weight of said sulfite to about 1 to 2 parts by weight of a 3% aqueous solution of said peroxide to produce a plastic mass therefrom, molding said plastic mass into a form appropriate to said article and dehydrating said molded plastic form of said admixture by contact with air heated to about 100 to 200° C.

13. A composite material produced by operation of the process as defined in claim 1.

14. An article produced by operation of the process described in claim 5.

15. The process as defined in claim 1 wherein said solid article comprises an egg.

16. In a process for producing a solid siliceous article utilizing an aqueous solution containing about 30 to 70% by weight of a soluble alkali metal silicate, wherein the alkali metal oxide to $SiO_2$ content ratio is in the range of about 2:1 to about 1:4, the steps comprising intermixing said solution in amounts sufficient to provide 5 to 15% silicate in the final product with a substantially inert filler and with a reacting admixture of sodium sulfite and hydrogen peroxide in proportions of about 4 parts by weight of said solution to about 2 parts by weight of said sulfite to about 1 to 2 parts by weight of a 3% aqueous solution of said peroxide to produce a plastic mass therefrom, molding said plastic mass into a form appropriate to said article and dehydrating said molded plastic form of said admixture by contact with air heated to about 100 to 200° C.

17. The process of claim 16 wherein the filler is calcium sulfate.

18. The process of claim 16 wherein the fillet is titanium dioxide.

References Cited by the Examiner

UNITED STATES PATENTS

| | | | |
|---|---|---|---|
| 360,350 | 3/1887 | Jurgens | 99—170 |
| 1,321,085 | 11/1919 | Booth | 106—84 |
| 2,034,522 | 3/1936 | Loetschev | 106—84 |
| 2,107,297 | 2/1938 | Kauffman | 106—74 |
| 2,647,069 | 7/1953 | Sterickev | 106—74 |
| 2,965,507 | 12/1960 | Lander | 106—84 |
| 2,998,328 | 8/1961 | Munger et al. | 106—84 |
| 3,102,038 | 8/1963 | Fisher | 106—84 |

FOREIGN PATENTS 24,005/35   8/1935   Australia

OTHER REFERENCES

Gilman: Inorganic Reactions, The Electric Publishers, Chicago, 1929, p. 249.

Vail: Soluble Silicates In Industry, The Chemical Catalog Company, Inc., New York, 1928, p. 121.

TOBIAS E. LEVOW, *Primary Examiner.*